United States Patent [19]

Hirashima

[11] Patent Number: 5,355,409
[45] Date of Patent: Oct. 11, 1994

[54] SCRAMBLE CODEC AND A TELEVISION RECEIVER INCORPORATING THE SAME

[75] Inventor: Masayoshi Hirashima, Osaka, Japan

[73] Assignee: Matsushita Electric Industrial Co., Ltd., Osaka, Japan

[21] Appl. No.: 31,539

[22] Filed: Mar. 15, 1993

[30] Foreign Application Priority Data

Mar. 13, 1992 [JP] Japan .................................. 4-089664
Mar. 13, 1992 [JP] Japan .................................. 4-089665

[51] Int. Cl.$^5$ ........................ H04N 7/167; H04L 9/02
[52] U.S. Cl. ......................................... 380/14; 380/19; 380/20; 380/43; 380/46
[58] Field of Search ....................... 380/14, 20, 43, 46, 380/19

[56] References Cited

U.S. PATENT DOCUMENTS

Re. 33,189  3/1990  Lee et al. .

FOREIGN PATENT DOCUMENTS 2161680A  1/1986  United Kingdom .

Primary Examiner—Stephen C. Buczinski
Attorney, Agent, or Firm—Ratner & Prestia

[57] ABSTRACT

A scramble codec comprises a latch means for holding an ID number for securing television or other communication data, a pair of memories which can be alternately loaded with input communication data signals in a predetermined cycle, a shift register which is initialized with the ID number held by the latch means to output dissimilar pseudorandom pulse signals in a predetermined cycle, an address setting circuit which sets, as the initial value, a value corresponding to the output of the shift register in scrambling and a value obtainable by subtracting the output of the shift register from the maximum address value of the memories in descrambling, and an address counter which reads communication data from the address designated by the address setting circuit. The above scramble codec has both the function of a decoder for scrambled communication data and the function of an encoder for scrambling communication data, is simple in construction and compact and features improved security.

The scramble codec, as such, can be easily built into a receiver such as a television receiver to provide, for example, a television receiver which does not only function as an information receiver but can be used in combination with a VTR or other recording device for the mutual transmission and reception of communication data with security fully retained.

Further improvement in security is obtained when the above scramble codec further comprises a nonvolatile key data memory for holding a specified key data and an EOR circuit which takes the exclusive logical sum of the ID number data held by the latch means and the output of the key data memory, with the output of the EOR circuit being set as the initial value in the shift register which outputs dissimilar pseudorandom pulse signals in a predetermined cycle.

21 Claims, 6 Drawing Sheets

SCRAMBLE CODEC AND A TELEVISION RECEIVER INCORPORATING THE SAME

SPECIFICATION

1. Title of the Invention

A scramble codec and a television receiver incorporating the same.

2. Background of the Invention

This invention relates to a scramble codec which can be used for scrambling data signals for purposes of security in information transmission systems which would otherwise be easily monitored by third persons, such as the transmission of television signals via a communication satellite. More particularly, the invention relates to a television receiver incorporating said scramble codec for security processing of signals which finds application, for example, in the transmission of television signals or on occasions information photographed with a video camera which is to be preserved without the risk of disclosure to others.

The recent development of various communication media and new recording media such as optical disks has made it feasible to transit data and information with a remarkably expanded coverage and at amazing speeds. On the other hand, the same technology has made it an easy chore to tap such data communications systems, making it increasingly difficult to insure the privacy of information. By way of illustration, it is now routine that corporate proprietary information is transmitted via communication satellites; data including confidential business information are communicated by way of video conferences; or the data generated in experiments performed in private laboratories are recorded on a video type recorder (hereinafter abbreviated as VTR), optical disk or other recording medium for subsequent reproduction and use, much of such data, pictures and voices are desirably concealed from third persons. In order to secure such information, a scramble encoder is generally employed. However, the conventional scramble encoders demand a large-scale encoding system and encoder and do not allow for an easy way in which to secure information.

Presented in FIG. 7 is a block diagram showing the basic construction of the conventional scramble encoder. As shown, the reference numeral 101 represents a computer (hereinafter abbreviated as CPU) which controls the entire scramble encoder. Depending on the system scale, a variety of CPUs from a personal computer to a large universal computer are employed. The picture signal and sound signal are applied to a picture scrambler 102, which scrambles the picture signal, and a sound scrambler 103, which scrambles the sound signal, respectively. A key signal generating circuit 104 generates a key signal which is synchronized with the picture signal. A superimposing circuit 105 superimposes this key signal on the picture signal scrambled by the picture scrambler 102. The sound signal is FM-modulated by an FM modulating circuit 106 and a mixing circuit 107 mixes it with the scrambled picture signal to provide a scrambled composite video signal.

The principle of operation of the so-called scramble encoder which performs such signal scrambling is now explained. While many systems can be contemplated and used for the picture scrambler 102, there is a scrambling technology which is known as line rotation in which the picture signal scan line, for instance, is cyclically shifted. This line rotation processing comprises setting a cutting point for shifting the picture signal scan line at x on the CPU 101, coding this cutting point x using the key signal (Kj) and forming this coded x into a binary signal in the key signal forming circuit 104 within the vertical retrace period. For scrambling the sound signal, the sound signal is A/D converted and encoded by adding a pseudorandom pulse signal (hereinafter abbreviated as PN signal). And only the initial value of this PN signal is superimposed and transmitted.

At the reception end which received the above signal, the signal can be descrambled by executing the reverse of the encoding procedure. Thus, for the descrambling of the sound signal, the initial value of PN is applied to a PN generating circuit to generate a PN signal series for descrambling and demodulation of the original signal is performed according to this PN signal series. For the descrambling of the picture signal, the read position (corresponding to the cutting point in scrambling) is logically determined from the initial value of PN transmitted every field or in a predetermined cycle. The algorithm for the above determination procedure is not disclosed for enhanced security.

However, the conventional scramble encoder/decoder is complicated in structure and, therefore, inevitably bulky. On the other hand, in the case of a television receiver, it acts as a data transmitter when the received data are scrambled and recorded on the VTR, optical disk or the like and, therefore, functions like a scramble encoder. But it also has to function like a decoder when it acts as a receiver which receives the scrambled communication data or receives the scrambled data from the VTR or optical disk for reproduction. However, it is difficult to build the conventional scramble encoder and decoder into a television receiver, partly because of their bulkiness. Therefore, only the decoder which performs descrambling has been reduced in size and built into the receiving hardware such as the television receiver.

3. Summary of the Invention

The present invention provides a scramble codec comprising a latch means for holding an ID number for securing communication data, a pair of memories for alternate writing of input communication data in a predetermined cycle, a shift register in which the ID number held by said latch means is set as the initial value and which outputs dissimilar pseudorandom pulse signals in a predetermined cycle, an address setting circuit which sets, as the initial value, a value corresponding to the output of said shift register in the scrambling of data and the value obtainable by subtracting the output of said shift register from the maximum address value of said memory in descrambling, an address counter which reads communication data from the address in said memory as set by said address setting circuit, and capable of acting as a scramble encoder-decoder having input signal scrambling and descrambling functions.

For a further improvement in security function, the present invention further provides a scramble codec further including a nonvolatile key data memory for holding a designated key data, an EOR circuit which takes the exclusive logical sum of the ID number held by said latch means and the output of said key data memory, the output of said EOR circuit being set as the initial value in said shift register which outputs dissimilar pseudorandom pulse signals in a predetermined cycle.

Furthermore, where the communication data is a composite signal including an analog signal, the present invention further provides a scramble codec comprising a latch means which holds an ID number for securing communication data, a pair of memories in which input communication data signals are alternately written in a predetermined cycle, a shift register in which the ID number held by said latch means is set as the initial value and which outputs dissimilar pseudorandom pulse signals in a predetermined cycle, an address setting circuit which sets a value corresponding to the output of said shift register as the initial value in the scrambling of communication data and sets the value arrived at by subtracting the output of said shift register from the maximum address value of said memory as the initial value in descrambling, an address counter which reads communication data from the address of said memory as set by said address setting circuit in a predetermined cycle, a conversion circuit which converts an input analog signal to a serial bit stream signal in scrambling, a demodulating circuit which demodulates the analog signal from the communication data signal and converts it to a bit stream in descrambling, a PN generating circuit to which the ID number held by said latch means is applied as the initial value and generates pseudorandom pulse signals for the analog signal, a first EOR circuit which calculates the exclusive logical sum of the output of said PN generating circuit and the analog signal converted to the bit stream, a modulating circuit which modulates the output of said first EOR circuit, a mixing circuit which mixes the signal modulated by said modulating circuit with the communication data signal, and a PCM demodulating circuit which demodulates the output of said first EOR circuit to the original analog signal.

The present invention further provides a television receiver having the function to scramble and descramble the picture signal of the television signal using the above scramble codec of the invention, which scramble codec comprises a latch means for holding a ID number for securing communication data, a pair of line memories in which input picture signals are written alternately for each horizontal scan line, a nonlinear feedback shift register in which the ID number held by said hold means is set as the initial value and which outputs dissimilar pseudorandom pulse signals for respective horizontal scan lines, an address setting circuit which sets, as the initial value, a value corresponding to the output of said nonlinear feedback shift register in scrambling and a value arrived at by subtracting the output of said nonlinear feedback shift register from the maximum address value of said line memory in descrambling and an address counter which reads signals for each horizontal scan line alternately from the addresses of said line memories as set by said address setting circuit.

The present invention further provides a television receiver further comprising a nonvolatile key data memory which stores key data differing from one television receiver model to another and an EOR circuit which takes the exclusive logical sum of the ID number held by said latch means and the output of said key data memory, the output of said EOR circuit being set as the initial value in said nonlinear feedback shift register which outputs dissimilar pseudorandom pulse signals for respective horizontal scan lines.

The present invention further provides a television receiver incorporating a scramble codec which, where the television signal is a composite video signal composed of a picture signal and a sound signal, comprises a latch means which holds an ID number for securing communication data, a pair of line memories in which the input picture signal is alternately written for each horizontal scan line, a nonlinear feedback shift register in which the ID number held by said latch means is set as the initial value and which outputs dissimilar pseudorandom pulse signals for respective horizontal scan lines, an address setting circuit which sets, as the initial value, a value corresponding to the output of said nonlinear feedback shift register in scrambling and a value arrived at by subtracting the output of said nonlinear feedback shift register from the maximum address value of said memory in descrambling, an address counter which reads signals for each horizontal scan line alternately from the addresses in said line memories as set by said address setting circuit, a conversion circuit which converts the input analog sound signal to a serial bit stream signal in scrambling, a demodulating circuit which demodulates the mound signal from the composite video signal to a bit stream in descrambling, a sound PN generating circuit which generates sound pseudorandom pulse signals, a first EOR circuit which takes the exclusive logical sum of the output of said sound PN generating circuit and the sound signal converted to the bit stream, a modulating circuit which modulates the output of said first EOR circuit in scrambling, a mixing circuit which mixes the signal modulated by said modulating circuit with the communication data signal, and a PCM demodulating circuit which demodulates the output of said first EOR circuit to the original analog signal in descrambling.

In the above scramble codec, input communication data signals are written alternately in a pair of memories in a predetermined cycle, the shift register is initialized with the ID number held by the latch means and outputs dissimilar pseudorandom pulse signals in a predetermined cycle, the address set by the address setting circuit is read using a value corresponding to the output of said shift register as the initial value in the scrambling of communication data, and the communication data signals are read alternately from said pair of memories by the address counter. In this manner, the communication data signal is scrambled by reading it from different positions in respective predetermined cycles.

In descrambling, the shift register is similarly initialized with the ID number held by said latch means, the address setting circuit is set using the value arrived at by subtracting the output of said shift register from the maximum address value of said memory, and the communication data signal written alternately into the pair of memories is read by the address counter using the output of the address setting circuit as the address. In this manner, the communication data are read from positions varying from one cycle to another to thereby scramble the communication data signals. In this manner, the scramble codec of the present invention functions both as a scramble encoder and a scramble decoder.

Furthermore, in the embodiment further including a nonvolatile key data memory which holds a designated key data and an EOR circuit which calculates the exclusive logical sum of the ID number held by said latch means and the output of said key data memory, the output of this EOR circuit is used by the shift register as the initial value to generate pseudorandom pulse signals differing from one cycle to another. In this embodiment, the receiver without the key data cannot tap the communication system, thus contributing further to the security effect.

When the communication data signal is a composite signal including an analog signal. The communication data is not only processed in the above manner but, in scrambling, the analog signal input is converted to a serial bit stream signal, the exclusive logical sum of this bit stream signal and the pseudorandom pulse signal output of the PN generating circuit, which is initialized with the ID number held by said latch means, is calculated in the first EOR circuit and its output is modulated in the modulating circuit and mixed with the communication data signal in the mixing circuit. In descrambling, the demodulating circuit demodulates the analog signal from the communication signal and converts it to a bit stream, the first circuit takes the exclusive logical sum of this analog bit stream signal and the pseudorandom pulse signal output of the PN generating circuit, which is initialized with the ID number held by said latch means, and the PCM demodulating circuit demodulates the output of this first EOR circuit to the original analog signal. In this manner, even when the communication data signal is a composite signal containing an analog signal, the scramble codec of the present invention can function as an effective scramble encoder-decoder.

The application of the scramble codec of the present invention to the scrambling and descrambling of the television picture signal is now described. The input picture signal, by horizontal scan line, is written in the pair of line memories and the nonlinear feedback shift register is initialized with the ID number held by said latch means to output pseudorandom pulse signals varying from one horizontal scan line to another. In the scrambling of the picture signal, the address setting circuit sets a value corresponding to the output of this nonlinear feedback shift register as the initial value and the address counter which uses this value as the read address value reads the picture signal alternately from the pair of line memories. As the signal is read from a position varying from one horizontal scan line to another, the picture signal is scrambled. In descrambling, the address setting circuit is initialized with the value arrived at by subtracting the output of said nonlinear feedback shift register from the maximum address value of said line memories and using the output of the address setting circuit as the read address the address counter reads the picture signal alternately from said pair of line memories. In this manner, the television receiver employing the scramble codec of the invention can scramble and descramble the input picture signal.

A television receiver having an added security function can be implemented by adding to the above system a nonvolatile key data memory which stores a key data differing from one receiver to another and an EOR circuit which calculates the exclusive logical sum of the ID number held by said latch means and the output of said key data memory and arranging so that said nonlinear feedback shift register is initialized with the output of said EOR circuit to output dissimilar pseudorandom pulse signal for respective horizontal scan lines. In this construction, only the television receiver having the key data can have access to the communication data, with the result that the information securing effect is further enhanced.

Moreover, when the television signal is a composite video signal comprising a picture signal and a sound signal, the picture signal is processed Just as described above, while the sound signal input is scrambled by converting it to a serial bit stream in the conversion circuit, calculating the logical exclusive sum of the bit stream signal and the pseudorandom pulse signal of the sound PN generating circuit initialized with the ID number held by said latch means in the first EOR circuit, modulating the output of said first EOR circuit in the modulating circuit and mixing the modulation output with the picture signal in the mixing circuit.

In descrambling, the demodulating circuit demodulates the sound signal from the composite video signal and converts it to a bit stream signal, the first EOR circuit takes the exclusive logical sum of the above bit stream signal and the pseudorandom pulse signal from the sound PN generating circuit initialized with the ID number held by said latch means and the PCM demodulating circuit demodulates the output of said first EOR circuit to the original sound signal. In this manner, even when the television signal is a composite video signal containing a sound signal, the scramble codec of the present invention enables the television receiver to scramble and descramble input signals.

DETAILED DESCRIPTION OF THE INVENTION

Figure 1:
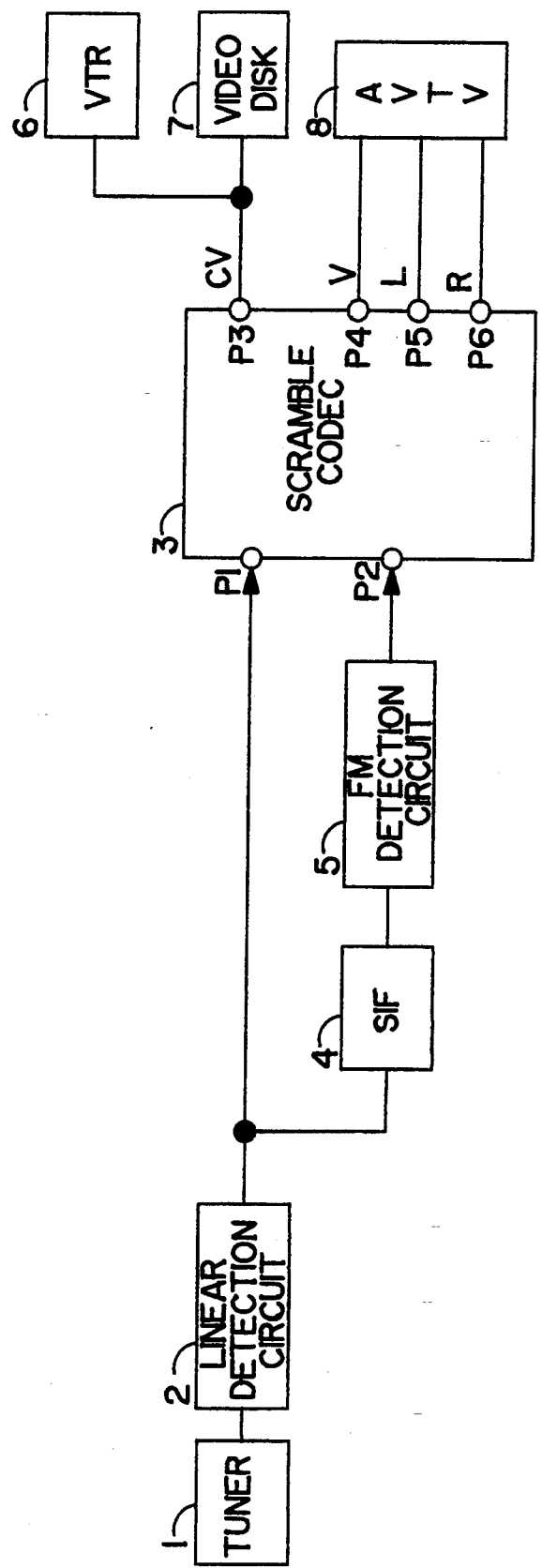
FIG. 1 is a block diagram showing the entire construction of a television receiver as an embodiment of the invention.

The scramble codec and the television receiver incorporating the codec are described with reference to the accompanying drawings. Referring to FIG. 1 which is a block diagram showing the entire construction of a television receiver having the scramble codec according to the invention as built therein. As shown, a tuner 1 is a television receiver, where the received signal is applied to a linear detection circuit 2. The signal detected by the linear detection circuit 2 is the so-called NTSC signal which is a composite signal obtained by the frequency-multiplexing of the 4.5 MHz carrier modulated by the sound signal with the picture signal. The NTSC signal is applied to an input terminal P1 of a scramble codec 3 embodying the present invention. This NTSC signal is also converted to a sound signal through a sound intermediate frequency (SIF) circuit 4 and an FM detection circuit 5 and fed to an aural input terminal P2 of the scramble codec 3. The scramble codec 3 scrambles the input picture signal and sound signal and outputs the scrambled signals from a terminal P3 for receding on a VTR 6 or a recordable video disk device 7. The picture signal is outputted from a terminal P4 and the left and right sound signals are also outputted from terminals P5 and P6, respectively, for reproduction of the picture and sound on a monitor AVTV8. This scramble codec 3 is thus a circuit which has the dual function of an encoder (scrambler) which scrambles the picture and sound signals and a decoder (descrambler) which descrambles the scrambled signals.

Figure 2:
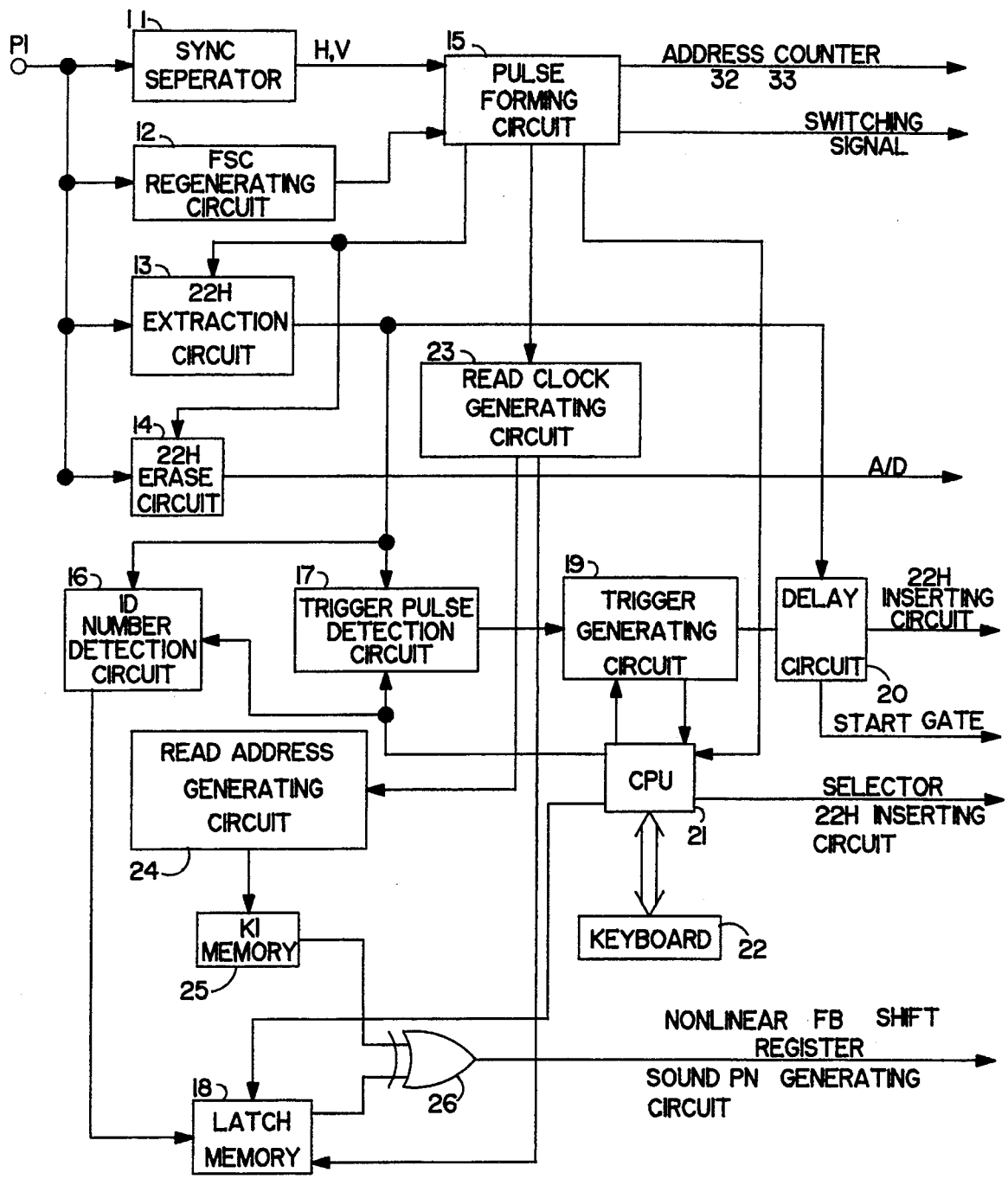
FIG. 2 is a block diagram showing a part of the scramble codec as an embodiment of the invention.

The circuit construction of this scramble codec 3 is now described. Referring to FIG. 2 which is a block diagram showing the picture signal processing part of the scramble codec 3, a synch separator 11, a $f_{sc}$ regenerating circuit 12, a 22H extraction circuit 13 and a 22H erase circuit 14 are connected to the terminal P1. The sync separator 11 is designed to separate the horizontal synchronizing signal H and vertical synchronizing signal V and its output is applied to a pulse forming circuit 15. The pulse forming circuit 15 supplies a clock signal and a gate pulse to various parts of the system. The $f_{sc}$ regenerating circuit 12 is a circuit adapted to regenerate the chrominance subcarrier ($f_{sc}$) and form a 4 $f_{sc}$ clock signal which is to be applied to the pulse forming circuit 15. The 22H extraction circuit 13 and 22H erase circuit 14 are circuits which respectively extract and erase the picture signal of the 22nd horizontal scan line (hereinafter referred to as 22H). The extracted 22B signal is applied to an ID number detection circuit 16 and a trigger pulse detection circuit 17. The ID number detection circuit 16 is a circuit which extracts the ID number data superimposed on the picture signal portion of the 22th horizontal scan line in descrambling and its output is applied to a latch memory 18. The trigger pulse detection circuit 17 is a detection circuit which extracts the trigger pulse representing the start of scrambling from the signal superimposed on the picture signal portion of the 22nd horizontal scan line and its output is applied to a scramble trigger generating circuit 19. This scramble trigger generating circuit 19 generates a scramble trigger in scrambling and its output is applied to a delay circuit 20. When the signal is a non-scrambled signal, the delay circuit 20 delays not only the 22H signal extracted by the 22H extraction circuit 13 but also the scramble trigger from the scramble trigger generating circuit 19.

In addition, a CPU 21 is connected as a controller for controlling the whole action of this scramble codec 3. Connected to this CPU 21 is a keyboard 22 as an input means for entering the ID number as a secret code. The CPU 21 feeds the ID number data entered at the keyboard 22 to a latch memory 18 and controls the various parts. The output of said pulse forming circuit 15 is applied to a read clock generating circuit 23.

The read clock generating circuit 23 not only applies a read clock to the latch memory 18 but also applies a clock signal to a read address generating circuit 24. The output terminal of this read address generating circuit 24 is connected to a Ki memory 25. The Ki memory 24 is a nonvolatile key data memory which stores a key data exclusive to the particular scramble codec. This key data is comprised, for example, of 64 bits. Of the 64 bits, 8 bits may be used as parity bits. The latch memory 18 is a memory means which holds the ID number entered at the keyboard 22 or the ID number detected by the ID number detecting circuit 16. When the latch memory 18 is to hold an ID number of 4 digits, it is constructed as a 16-bit memory. The ID number and key data read from the latch memory 18 and Ki memory 25, respectively, are fed to an EOR circuit 26. The EOR circuit 26 corresponds to the second EOR circuit which takes the exclusive logical sum of said ID number and key data and its output is fed, as the initial value, to a nonlinear feedback shift register 31 shown in FIG. 3 and a sound PN generating circuit 51 shown in FIG. 4.

Figure 3:
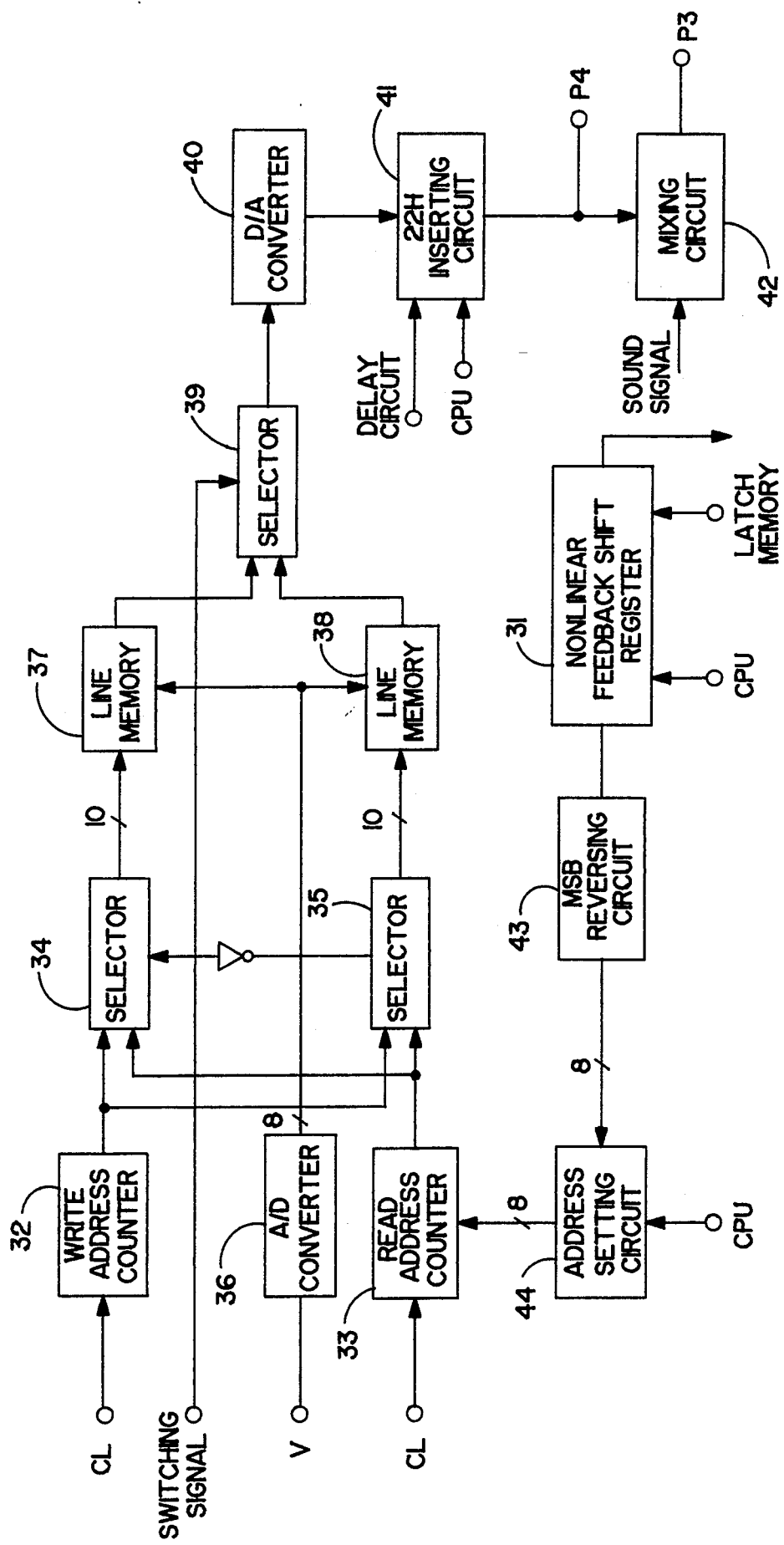
FIG. 3 is a block diagram showing a part (picture signal processing block) of the same scramble codec.

FIG. 3 is a block diagram showing a part of this scramble codec 3 which scrambles and descrambles the picture signal. As shown, the 4 $f_{sc}$ clock signal from the pulse forming circuit 15 shown in FIG. 2 is applied to a write address counter 32 and a read address counter 33. These address counters are adapted to count the input clock pulses and their parallel outputs are fed to selectors 34 and 35. The picture signal from which 22H has been eliminated by the 22H erase circuit 14 is applied to an A/D converter 36. The A/D converter 36 is a device which converts an analog picture signal to digital picture signal and its output is applied to line memories 37, 38. The selectors 34 and 35 are supplied with gate signals synchronized with the horizontal synchronizing signal H from the pulse forming circuit 15 and apply a write address and a read address alternately to said line memories 37, 38. Each of the line memories 37, 38 is a memory which stores 744 picture signal dots per horizontal scan line in 8 bits. The line memories 37, 38 are used in writing data in the write address designated by the write address counter 32 which is selected by the selectors 34, 35 and reading data from the read address designated by the read address counter 33 which is also selected by selectors 34, 35. A selector 39 is synchronized with selectors 34, 35 and selects the read signal. The output of the selector 39 is applied to a D/A converter 40. The D/A converter 40 converts the selected signal to an analog signal and its output is applied to a 22H inserting circuit 41. To the 22H inserting circuit 41 is applied the picture signal of the 22nd horizontal scan line through the delay circuit 20. The 22H inserting circuit 41 aligns the scramble trigger of the 22nd horizontal scan line removed by the 22H erase circuit 14 with the picture frame signal and sound frame signal and inserts the 22H in timing as a picture signal. The output of this 22H inserting circuit 41 is applied, as a scrambled signal or a descrambled signal, to a mixing circuit 42. The mixing circuit 42 mixes this picture signal with the modulated FM sound signal and its output is applied to a composite video signal terminal P3 of the scramble codec 3. The output terminal of the 22H inserting circuit 41 is connected to an output terminal R4 which outputs the picture signal prior to said mixing.

Figure 5:
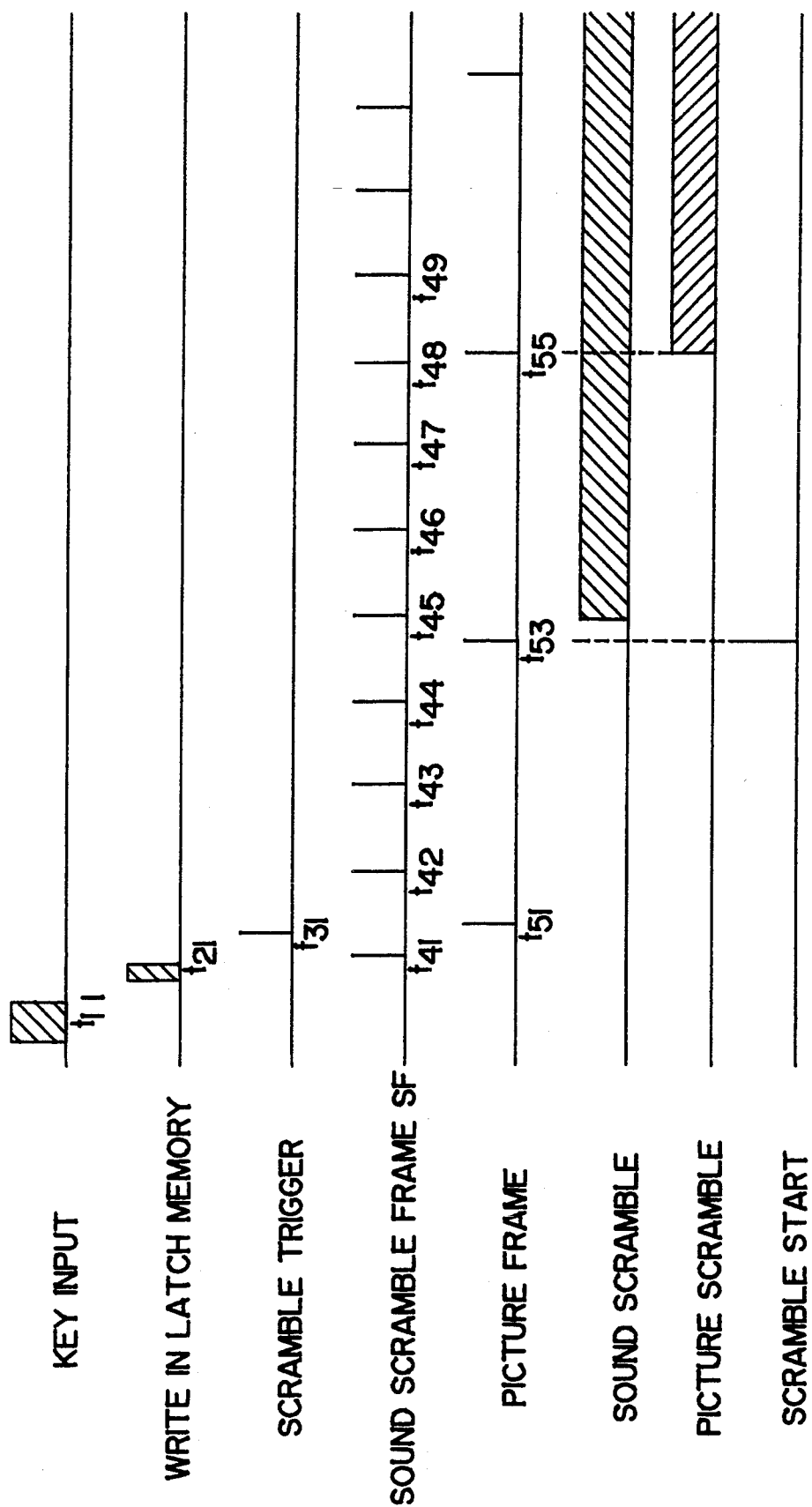
FIG. 5 is a time chart showing the operation of the same embodiment.

The nonlinear feedback shift register 31 may, for example, be the circuit shown in FIG. 5 of the supplement to Ministry of Posts and Telecommunications Notification No. 53 published in the Official Gazette (Special Issue No. 7) of Jan. 25, 1990 (not shown). The output of this nonlinear feedback shift register 31 is used to determine the cut-point of the horizontal scan line. Since the maximum value of this cut-point is 186 within 1H (1 horizontal scanning period), data of 8 bits are used and for 186 and higher values, MSB is reversed. An MSB reversing circuit 43 reverses the MSB in response to the above output and its output n (=0~185) is applied to an address setting circuit 44. The address setting circuit 44 is adapted to calculate and set the initial value of read address for each horizontal scan line in such a manner that the value will be equal to 4n for scrambling and, assuming that the maximum value of read address is 774, equal to 774−4n for descrambling.

The block which performs sound signal scrambling and descrambling is now described with reference to FIG. 4. First, a sound signal input terminal P2 is connected to an input terminal of an A/D converter 52. The A/D converter 52 is a device which converts an analog sound signal to a 14-bit digital signal and its output is applied to a P/S converter 53. The P/S converter 53 converts the input signal to a serial bit stream, to which control information is applied from a sound control circuit 54. This serial output is applied to a selector 55. The A/D converter 52 and P/S converter 53 taken together constitute a conversion circuit for converting an input analog sound signal to a bit stream. On the other hand, the terminal P1 is connected to a band-pass amplifier (BPA) 56 which amplifies the 4.5 MHz signal and its output is applied to a QPSK demodulating circuit 57. The QPSK demodulating circuit 57 outputs the binary signal of 720 KHz as a bit stream to the selector 55. The selector 55 selects either signal according to whether descrambling or scrambling is being performed and applies it to an EOR circuit 58 and a selector 59. The EOR circuit 58 corresponds to the first EOR circuit described hereinbefore.

The sound signal processing block has a sound PN generating circuit 51 whose function is comparable to that of a nonlinear feedback shift register in the picture signal processing block. While this sound PN generating circuit 51 may be of the same construction as the nonlinear feedback shift register 31, a different circuit is used in this embodiment. Thus, the sound PN generating circuit 51 is a circuit which generates an aural PN signal and its output is applied to the other input terminal of said EOR circuit 58 through a delay circuit 60. The EOR circuit 58 has the function to scramble the sound signal or descramble the scrambled sound signal, according to the exclusive logical sum of the sound PN signal and the output of said P/S converter 53 and its output is fed to the selector 59. The selector 59 selects the output of the selector 55 for the non-scrambled signal in each frame and the output of the EOR circuit 58 for the scrambled signal, and supplies the output to a QPSK modulating circuit 61 in scrambling and to a PCM demodulating circuit 62 in descrambling. The QPSK modulating circuit 61 modulates this signal and applies it to the mixing circuit 42. The PCM demodulating circuit 62 converts this signal to a parallel signal and further to an analog signal, thus effecting PCM demodulation, and its output terminal is connected to sound output terminals P5, P6.

The operation of this embodiment is now described with reference to the time chart shown in FIG. 5. First, the NTSC signal such as a television camera signal is fed to the input terminal P1 indicated in FIG. 2 for encoding by scrambling. In this case, the keyboard 22 is used to enter an ID number of, say, 4 digits in the first place. The time of completion of this input procedure is designated $t_{11}$ as indicated by "Key input" in FIG. 5. The CPU 21 performs key scanning, reads this 4-digit ID number (BCD code) and loads (writes) the latch memory 18 with the number. This BCD code, consisting of 16 bits, is expanded to 64 bits by a predetermined procedure and, together with the 64-bit key data in the Ki memory, is applied to the EOR circuit 26 where the exclusive logical sum is taken and used for scrambling. This BCD code is superimposed on the picture signal in the 22H horizontal scanning period. Encoding the ID number at this stage insures a greater security but since the present invention is fully effective for all practical purposes even without introducing such complexity, no such encoding procedure is included in the following description.

The end time of loading (writing) of the latch memory 18 is designated $t_{21}$ as indicated in FIG. 5. At a suitable period of time after $t_{21}$, a clock pulse is supplied from the CPU 21 to the scramble trigger generating circuit 19, which accordingly outputs a 24-bit scramble trigger. This pulse train may be any type of signal but to avoid intermingling with the picture signal, the teletext CR16 bits, for instance, are used in common with the teletex and the frame code is changed to "11100111". Thus, the entire code is "101010101010101011100111". Here, the scramble trigger generating circuit 19 is constructed as a fuse ROM, which outputs this scramble trigger pulse at a suitable time after $t_{21}$, i.e. the end time of loading of the latch memory 18. This scramble trigger is delayed by the delay circuit 20 and inserted into 22H by the 22H inserting circuit 41. As mentioned hereinbefore, the delay circuit 20 is designed to delay the scramble trigger for timing it with the sound frame signal supplied every 1 msec and the picture free signal supplied every 33 msec. Thus, the scramble trigger is delayed with the 22H gate pulse, 4 $f_{sc}$ clock pulse and sound frame scramble pulse $S_f$ and inserted in the 22H. The delay circuit 20 also generates a sound scramble start gate signal, which is applied to a delay gate 60. And only when this gate signal is at the high level, the output of the delay gate 60 becomes equal to the output of the sound PN generating circuit 51 (changed to either 0 or 1). It is assumed, for explanation's sake, that the time relationship of the sound frame signal, picture frame signal and scramble trigger is as illustrated in FIG. 5, that is to say the time $t_{31}$ of the scramble trigger slightly precedes the start $t_{51}$ of the picture frame signal.

First, scrambling of the sound signal is explained. Since the use of pulse code modulation (PCM) is more convenient for sound signal scrambling, it is assumed that PCM is performed and that a system similar to a satellite television broadcasting system is used. However, in order that the composite video signal may be accommodated in a 6 MHz band and the video signal may be recorded by the NTSC signal system using the CATV and wide band recordable VTR (it is sufficient that the band allows the MUSE signal to be recorded as it is and the band width of the VTR of the SVHS system may be somewhat broadened), the 4.5 MHz carrier is subjected to QPSK with the sound signal (PCM) of 720 bps.

Figure 4:
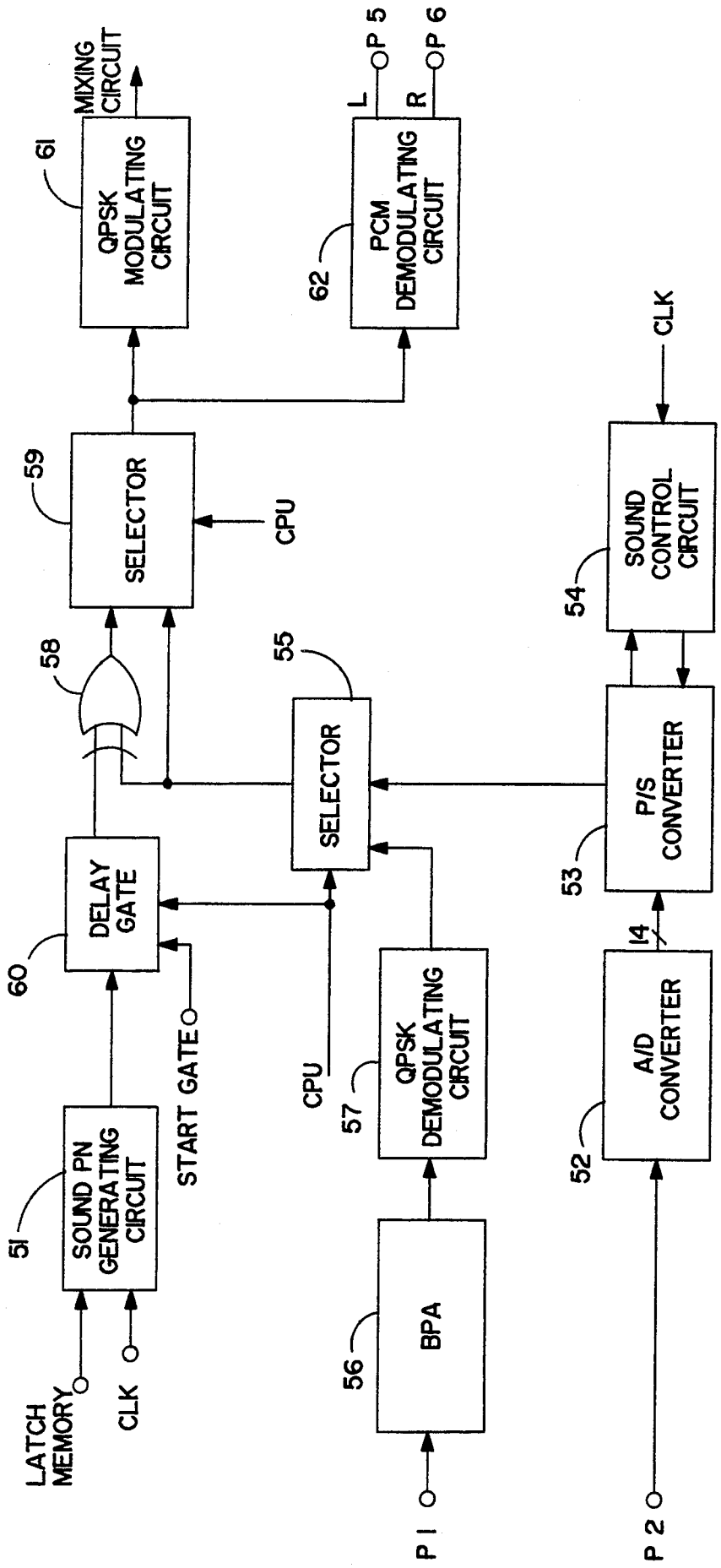
FIG. 4 is a block diagram showing another part (sound signal processing block) of the same scramble codec.

The NTSC sound signal applied to the terminal P1 shown in FIG. 4 is simultaneously FM-detected and applied from the input terminal P2 to the A/D converter 52. When the sound is multiplexed, the left and right channel outputs are applied to the terminal P2. If the camera output has been separated into a picture component and a sound component, the sound component is directly applied to the terminal P2 and in the reception of the broadcast signal, the output of the linear detector is applied to the terminal P1. In this configuration, when one A/D converter is used for stereo 2-channel sound, too, a sample hold circuit is interposed between the A/D converter 52 and the input terminal P2 and the left and right channels are alternately A/D converted. These 2-channels are sampled at 32 KHz, quantized in 14 bits and subinstantaneously compressed to 10 bits. This is similar to two channels among the 4 channels of the sound A mode of satellite television. The transmission capacity is sufficient if it is 720K bits, which is the sum of $32K \times 2 \times 10 = 540K$ bits, 64K bits for control information and 16k bits for related information. In satellite television broadcasting, the signal of 2.048 Mbps is subjected to a frequency shift of about ±3.5 MHz by QPSK and transmitted but in the closed loop such as VTR and CATV, the frequency shift may be small because the signal degradation is not remarkable. Moreover, since the transmission capacity is only about one-third, the overall frequency shift can be controlled to one-sixth, namely ±600~700 KHz. Therefore, inclusive of the picture signal, a band of 6 MHz is sufficient. This A/D converted output is converted to a serial signal by the P/S converter 53 and after addition of the control signal and, if necessary, related information as well from the sound control circuit 54, a digital signal train of 720k bps is formed and supplied to the EOR circuit 58 through the selector 55.

The generation of said PN signal train is now explained. The Ki memory 25 stores an exclusive 64-bit key data for each scramble codec. The ID number held by said latch memory 18 is expanded to 64 bits and using this expanded ID number data and the key data, the EOR circuit 26 takes the exclusive logical sum and supplies 32 bits to the nonlinear feedback shift register 31 and sound PN generating circuit 51 as the initial value. The nonlinear feedback shift register 31 and sound PN generating circuit 51 are each a 32-bit shift register, although a 16-bit register may likewise be employed.

When the clock frequency for the sound PN generating circuit 51 is 720 KHz, which is equal to that of the sound bit stream, the signal can be used directly as PN signal. If the clock is slower, the content of the Nonlinear feedback shift register 38 can be shifted by one bit per msec and the initial value of 32 bits can be taken into the sound PN generating circuit every msec. In this manner, the sound PN generating circuit 51 generates a PN signal train of $2^{32}-1$. The PN signal train is thus generated and the phase difference between the picture frame signal, sound frame signal and scramble trigger is adjusted by the delay gate 60. And the exclusive logical sum of the sound PN signal output from the delay gate 60 and the PCM modulated signal obtained through the selector 55 is formed by the EOR circuit 58. In this way, the sound signal is scrambled, QPSK-modulated through the selector 59 and fed to the mixing circuit 42.

The processing of the picture signal is now explained. As the picture signal is applied to the input terminal P1 shown in FIG. 2, the sync separator 11 separates the horizontal synchronizing signal H and vertical synchronizing signal V and the 22H erase circuit 14 extracts or erase 22H. The signal from which 22H has been erased is applied to the A/D converter 36 shown in FIG. 3. When the picture signal is not scrambled, the signal input to the A/D converter 36 is converted to an 8-bit digital value and the line memories 37, 38 are written or read alternately. In this case, the signal is delayed by the equivalent of one line and applied to the D/A converter 40 through the selector 39. Into this analog signal is inserted the 22H through the 22H inserting circuit 41 to provide a video signal.

The scrambling procedure (line rotation) is now described. The line rotation is carried out as lows.

To begin with, the read addresses of the line memories 37, 38 are aligned with the picture signal cut-point. As the cut-point, 8 bits of the output of the nonlinear feedback shift register 31 are employed. Since the cut-point is specified to be 186 at the maximum, MSB is reversed by the MSB reversing circuit 43 for values of 186 and greater. The output of the MSB reversing circuit 43 is an 8-bit signal of 0~185 and varies from one line to another. It is now defined as n. In the address setting circuit 44, 4n is preset before the end of the 22nd H of the input picture signal at terminal P1 (the 21nd H of the output of D/A converter 40). Thus, the operation of 4×n is performed in scrambling. Then, beginning with the start of the 23rd H of the picture signal input to the terminal P1 (the 22nd H at the D/A converter 40), the read address counter 33 counts 4n, 4n+1, 4n+2 .. . and when 744 is reached, returns to 0 and continues to count 1, 2, 3 ... 4n−1. Then, as shown at $\phi_0$ in FIG. 6, the data $a_1 \neq a_9$ per horizontal scan line of the "original signal" written in the line memory 37 are read as $a_4, a_5 \ldots a_9, a_0, a_1, a_2$ and $a_3$ and thus scrambled as shown at $\phi_1$ "after scrambling (line rotation)". The 24th H signal input during this time is directly written into the line memory 38. After reading of $\phi_1$ and by the start of reading of the 24th H, the read start signal which is set in the read address counter 33 has been shifted by a predetermined number of bits and changed to a different figure K, instead of n, as shown at $\phi_3$ in FIG. 6. The number of bits by which this shift register is shifted per H is determined at the stage of system design.

Figure 6:
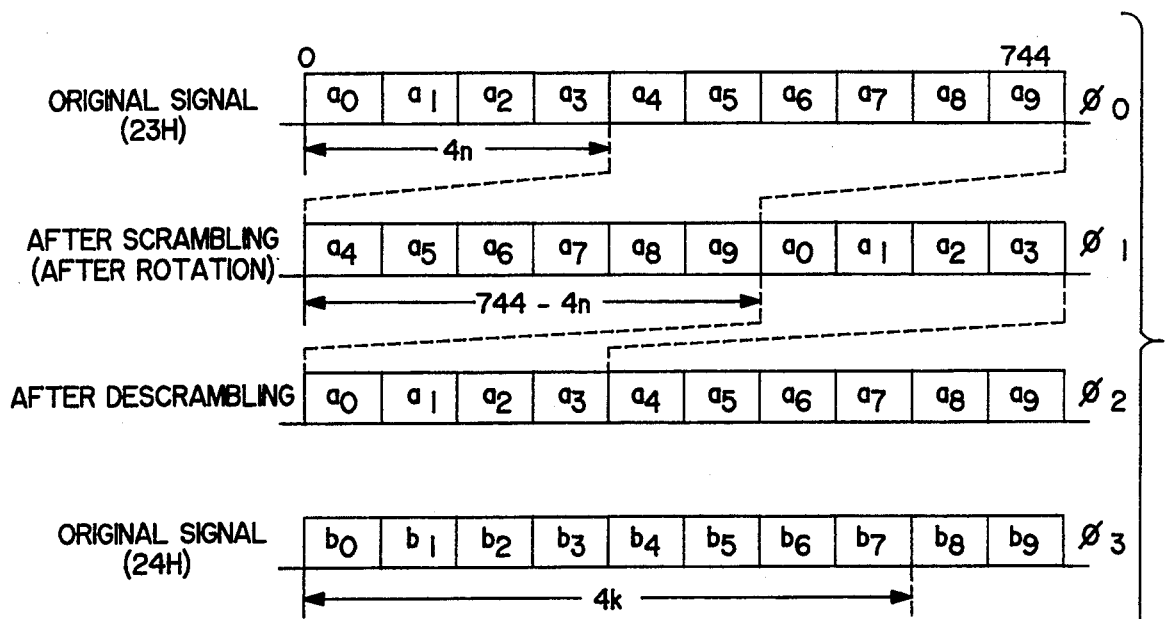
FIG. 6 is a diagram showing changes in the horizontal scan line in scrambling and descrambling.
Figure 7:
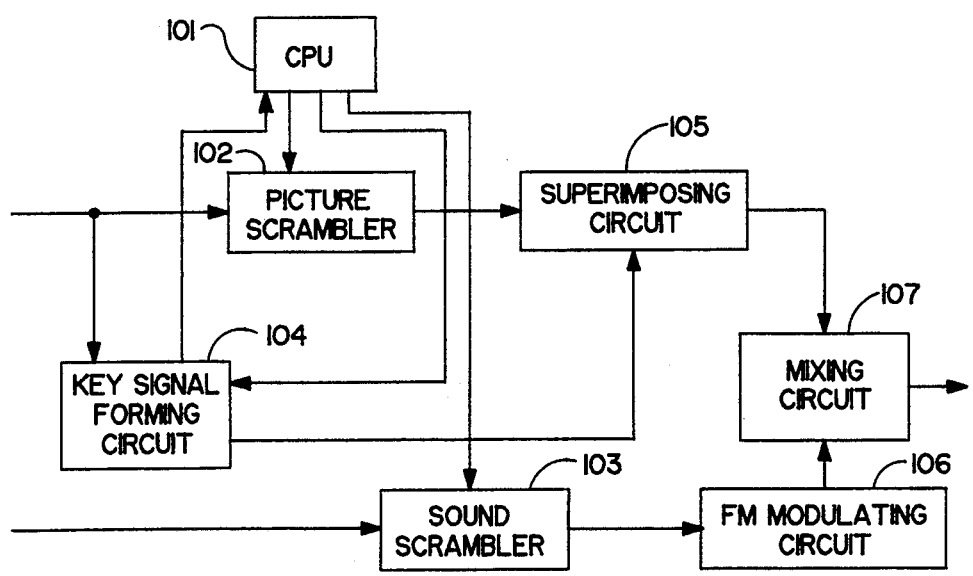
FIG. 7 is a block diagram showing the construction of the conventional scrambling device.

Then, during the input of the 25th H signal to the terminal P1, the data (24th H) is read from the line memory 38. In this case, the output of the read address counter 33 is augmented as 4k, 4k+1 ... as shown in FIG. 6. This is similar to the reading of 23rd H from the line memory 37. In other words, a line rotation has been applied with 4k as the cut-point. In this manner, the picture signal from 23H to 262H of the field beginning at $t_{55}$ shown in FIG. 5 can be scrambled by applying line rotation to respective horizontal scan lines.

The scramble trigger is inserted in the 22nd H of the thus-scrambled picture signal. According to the teletext specification, this trigger signal permits superimposition of 296 bits of digital signal per H (one horizontal scanning period).

When the leading 24 bits are used for the scramble trigger, the remaining 272 bits can be used for data. The ID number data in the latch memory 18 is read from the CPU 21 and inserted into 22H following the output of the trigger generating circuit 19. When the same error correcting code as that for teletext is used, the available 192-bit data capacity is sufficient for the data used in a closed loop.

What is important here is the fact that the output of a shift register which outputs pseudorandom pulse signals in a predetermined cycle (every horizontal scanning time in this embodiment) is used for the determination of the scramble cut-point for line rotation, and specifically in this embodiment 8 bits of the output of the nonlinear feedback shift register 31 via the MSB reversing circuit 43 are used. Therefore, the relationship of n and k for determining the cutpoint is nonlinear as described above and varies from one line to another so that it cannot be predicted. This means that even if n is known, k cannot be known. Thus, in this embodiment, the exclusive logical sum of the key data and ID number data read from the Ki memory 25 and latch memory 18 is taken in the EOR circuit 26 and the nonlinear feedback shift register 31 is initialized with its output. It can be seen, however, that a sufficiently high security can be assured by using an ID number alone and obtaining said initial value from the ID number data. Thus, this invention can very effectively secure the picture signal by applying a sophisticated encoding to the rotation cut-point.

On the other hand, the output of the 22H inserting circuit 41 is supplied to the mixing circuit 42 where it is mixed with the 4.5 MHz sound signal output of the QPSK modulating circuit 61 to give an NTSC-like signal. This signal is outputted from the output terminal P3 and recorded on the VTR 6 or video disk 7 as mentioned hereinbefore.

In this embodiment the signal thus recorded cannot be descrambled unless it is reproduced by using a television receiver incorporating a scramble codec of the same key data Ki. In addition, it is necessary for reproduction that the receiver has a shift register function to output dissimilar pseudorandom pulse signals for respective horizontal scan lines for determining the scramble cut-point of line rotation.

While the scramble trigger is generated once after key data input, the reproduction of the scrambled signal recorded on the VTR 6 or video disk 7 will not necessarily be performed from the beginning. Therefore, it is recommendable to generate scramble trigger pulses in a predetermined cycle and superimpose them on the picture signal as mentioned above. This can be easily accomplished by means of CPU 21. For example, the CPU 21 can be programmed so that the trigger generating circuit 19 will generate a scramble trigger every minute (1800 frames).

The operation of reading the scrambled signal from the VTR 6 or video disk 7 and descrambling it is now explained. In an exemplary embodiment of the present invention, the same scramble codec that was used for scrambling is used for descrambling. Thus, for reproduction of the output of said VTR 6, its reproduction output terminal is connected to the input terminal P1. The output of VTR 6 is assumed here to be a composite of a picture signal and a sound signal derived by QPSK modulation of the 4.5 MHz carrier with 720 KHz.

In descrambling of the sound signal, the signal input to the input terminal P1 shown in FIG. 4 is amplified by a band-pass amplifier (BPA) 56 with a center frequency of 4.5 MHz and demodulated in a QPSK demodulating circuit 57 to give a binary signal (bit stream) of 720K bps. As demodulation is instructed at the keyboard 22, the output of the QPSK demodulating circuit 57 is transmitted from CPU 21 through selector 55 to the EOR circuit 58. By adding to the scrambled bit stream the PN train added for scrambling and taking the exclusive logical sum as described hereinafter, there can be obtained an unscrambled bit stream. The selector 59 is adapted to switch the input according to whether the signal has been scrambled or not and an unscrambled bit stream signal is available at its selected output terminal. This signal is demodulated in the PCM demodulating circuit 62 and outputted from the terminals P5, P6. When the addition period of the PN signal train cannot be directly designated with the CPU 20, the output of the clock pulse generating circuit 15 and the gate signal formed in CPU 21 are employed.

The formation of the PN signal train for use in this descrambling is now explained.

First, from the picture signal applied to the terminal P1 shown in FIG. 2, the horizontal synchronizing signal for 22nd H is extracted in the 22H extracting circuit 13 and the scramble trigger pulse is detected with the trigger pulse detection circuit 17. Moreover, the ID number is detected by the ID number detection circuit 16. Since the signal of the same system as teletext broadcasting is superimposed on the 22nd H signal, the ID number can be easily extracted by supplying the clock pulse to the 22H extraction circuit 13 and ID number detection circuit 16 as in the case of a teletext receiver. The ID number is transmitted in 16 bits from the ID number detection circuit 16 to the latch memory 18. The content of this memory is read by applying a clock from the read clock generating circuit 23 and expanded to 64 bits and, together with the 64-bit data from the Ki memory 25, this expanded data is fed to the EOR circuit 26 in the same manner as in scrambling to decode the 64 bits. Of the decoded 64 bits, 32 bits are supplied to the nonlinear feedback shift register 31 and sound PN generating circuit 51 in the same manner as in scrambling to set them as the initial value. Then, in the same manner as in scrambling, the sound PN signal is generated. By the above procedure, the sound signal is descrambled.

The descrambling of the picture signal is now explained. For return from the state shown at $\phi_1$ "after scrambling" to the state at $\phi_2$ "after descrambling" in FIG. 6, it is necessary that the read address counter 33 be initialized with (744−4n) in time with the outputting of n from the nonlinear feedback shift register 31. The key for this may be in common with that for sound signal processing, and which portion (8 bits) of the nonlinear feedback shift register 31 is used can be determined at scrambling. For this purpose, the output of the MSB reversing circuit 43 is applied to the address setting circuit 44 by controlling the CPU 21. The address setting circuit 44 performs the operation of 744−4n in descrambling and presets the result as the read address in the read address counter 33. As a result, as shown at $\phi_2$ in FIG. 6, the 22nd H horizontal scan line is sequentially read from $a_0$ to $a_9$ as in the case of $\phi_0$. During this time the line memory 38 is loaded with the rotated 24th H signal and, here, the reading for descrambling begins at 744−4K and proceeds to $b_0$, $b_1$ . . . . On the other hand, the write address counter 32 is so set that the input is written as it is into the line memory 37 or line memory 38 for each horizontal scan line. Therefore, no special processing for descrambling is required.

In the embodiment described above, the maximum address value of line memories was set at 744 and, as the initial value, a value corresponding to the output of nonlinear feedback shift register 31 was used in scrambling, while the value arrived at by subtracting the output of the nonlinear feedback shift register 31 from the maximum address value of the line memories was used in descrambling. The same effect can be obtained by using the value arrived at by subtracting the output of the nonlinear feedback shift register 31 in scrambling and a value corresponding to the output of the nonlinear feedback shift register 31 in descrambling.

The picture signal of each horizontal scan line which is thus read is applied to the D/A converter 40 selected by the selector 39 and converted to an analog picture signal. Then, after insertion of the 22nd H line by the 22H inserting circuit, the analog picture signal is mixed with the sound signal and the composite video signal is outputted. The descrambled signal can then be displayed on AVTV 8.

As described in detail hereinbefore, the majority of the circuits in the scramble codec 3 are digital signal processing circuits and can therefore be easily integrated as an LSI. Excepting the sync separator 11, $f_{sc}$ regenerating circuit 12, 22H inserting circuit 41, keyboard 22, A/D converter 36, 52, D/A converter 40, BPA 56, QPSK demodulating circuit 57, PCM demodulating circuit 62 and mixing circuit 42, the number of gates in this scramble codec 3 is 50 to 60 thousand which is the scale allowing integration in one chip. Moreover, as to the QPSK demodulating circuit 57 and PCM demodulating circuit 62, the BS tuner LSI can be modified so as to be compatible with both 2.048 and 720 Kz. Thus, by integrating the major part of the scramble codec into one chip, the degree of security against tapping or other illegal acts is increased.

While, in this embodiment, the ID number used in scrambling is inserted together with the scramble trigger in 22H, it may be so arranged that the same ID number must be entered at the keyboard and retained in the latch memory before reproduction. In this case, the original signal cannot be regenerated unless the same ID number is entered from the keyboard.

It will be apparent from the foregoing description that by means of the scramble codec of the invention, communication data can be scrambled with a high degree of security and descrambled using the same circuitry. Since only one scramble codec having scrambling and descrambling functions is employed, the circuit fabrication is greatly simplified and facilitated and by incorporating this scramble codec in a television receiver, there can be provided a television receiver insuring a high degree of security at low cost. Furthermore, by setting the initial value using both she key data and the ID number, a still greater protection against tapping can be insured.

Moreover, even when the communication data signal is a composite signal of a sound signal and a picture signal, the scrambling and descrambling of the sound signal can be accomplished using one sound PN generating circuit and by using this processing in combination with the scrambling of the picture signal, a sophisticated degree of security signal processing can be accomplished.

What is claimed is:

1. A scramble codec comprising:
   means for storing an identification number to secure communication data,
   data storage means for receiving input communication data written in a first predetermined cycle, said data storage means having a maximum address value,
   shift register means, being initialized as a function of the identification number, for outputting dissimilar pseudorandom pulse signals in a second predetermined cycle,
   address setting means for generating and outputting a first value corresponding to the output of said shift register means during scrambling of communication data and a second value determined by subtracting the output of said shift register means from the maximum address value of the data storage means during descrambling, and
   address counter means for providing addresses to said data storage means starting from one of the first and second values generated by said address setting means in said second predetermined cycle.

2. A scramble codec according to claim 1 further comprising:
   memory means for holding and outputting specified key data values,
   exclusive-or means for calculating and outputting an exclusive logical sum of the identification number and the output of said memory means, and
   said shift register means being initialized with the output of said exclusive-or means.

3. A scramble codec comprising:
   means for storing an identification number to secure communication data,
   data storage means for receiving input communication data written in a first predetermined cycle, said data storage means having a maximum address value,
   shift register means, being initialized as a function of the identification number, for outputting dissimilar pseudorandom pulse signals in a second predetermined cycle,
   address setting means for generating and outputting a first value determined by subtracting the output of said shift register means from the maximum address value of said data storage means during scrambling of communication data and a second value corresponding to the output of said shift register means during descrambling of communication data, and
   address counter means for providing addresses to said data storage means starting from one of said first and second values generated by said address setting means in said second predetermined cycle.

4. A scramble codec comprising:
   means for storing an identification number to secure communication data,
   data storage means for receiving input communication data written in a first predetermined cycle, said storage means having a maximum address value,
   shift register means, being initialized as a function of the identification number, for outputting dissimilar pseudorandom pulse signals in a second predetermined cycle,
   address setting means for generating and outputting a first value corresponding to the output of said shift register means during scrambling of communication data and a second value determined by subtracting the output of said shift register means from the maximum address value of the data storage means during descrambling,
   address counter means for providing addresses to said data storage means starting from one of the first and second values generated by said address setting means in said second predetermined cycle, conversion means for converting a first analog signal from said input communication data to a first serial bit stream signal during scrambling,
   demodulating means for demodulating a second analog signal from said communication data signal and converting it to a second bit stream,
   pseudorandom pulse signal generating means, being initialized as a function of the identification number, for generating and outputting pseudorandom pulse signals for the first analog signal during descrambling,
   first exclusive-or means for calculating and outputting an exclusive logical sum of the output of said pseudorandom pulse signal generating means and one of said first and second bit streams,
   modulating means for modulating the output of said first exclusive-or means during scrambling and producing an output,
   mixing means for mixing the output of said modulating means with the communication data signal, and
   demodulating means for demodulating the output of said first exclusive-or means to obtain an original analog signal.

5. A scramble codec according to claim 4 further comprising
   nonvolatile key data memory for holding and outputting specified key data values and
   second exclusive-or means for calculating and outputting an exclusive logical sum of the identification number and the output of said key data memory and said shift register means being initialized with the output of said second exclusive-or means and said generating means being initialized with the output of said second exclusive-or means.

6. A scramble codec comprising:

means for storing an identification number to secure communication data, data storage means for receiving input communication data written in a first predetermined cycle, said data storage means having a maximum address value, shift register means, being initialized as a function of the identification number, for outputting dissimilar pseudorandom pulse signals in a second predetermined cycle, address setting means for generating a first value determined by subtracting the output of said shift register means from said maximum address value of said data storage means during scrambling of said communication data and a second value corresponding to the output of said shift register means during descrambling of said communication data address counter means for providing addresses to said data storage means starting from one of said first and second values generated by said address setting means in said second predetermined cycle, conversion means for converting a first analog signal from said input communication data to a first serial bit stream during scrambling, demodulating means for demodulating a second analog signal from said communication data signal and converting it to a second bit stream, pseudorandom pulse signal generating means being initialized as a function of the identification number, for generating and outputting pseudorandom pulse signals for the first analog signal during descrambling, first exclusive-or means for calculating and outputting an exclusive logical sum of the output of said pseudorandom pulse signal generating means and one of said first and second bit streams, modulating means for modulating the output of said first exclusive-or means during scrambling and producing an output, mixing means for mixing the output of said modulating circuit with the communication data signal, and demodulating means for demodulating the output of said first exclusive-or means to obtain an original analog signal.

7. A scramble codec according to claim 1 wherein said shift register is a nonlinear feedback shift register.

8. A scramble codec according to claim 1 further including an input means for entering an ID number.

9. A television receiver incorporating a scramble codec for scrambling and descrambling a picture signal of a television signal, said scramble codec comprising:

means for storing an identification number to secure the picture signal, data storage means for receiving an input picture signal and for alternately writing each horizontal scan line of said input picture signal, said storage means having a maximum address value, register means, being initialized as a function of the identification number, for outputting dissimilar pseudorandom pulse signals for respective ones of said horizontal scan lines, address setting means for generating and outputting a first value corresponding to the output of said register means during scrambling of said input picture signal and a second value determined by subtracting the output of said shift register means from said maximum address value of said data storage means during descrambling of said input picture signal, and address counter means for providing addresses to said data storage means starting from one of said first and second values generated by said address setting means in order to alternatively read signals for each respective one of said horizontal scan lines from said data storage means.

10. A television receiver according to claim 9 further comprising a nonvolatile key data memory for storing and outputting specified key data values and exclusive-or means for calculating and outputting an exclusive logical sum of the identification number and the output of said key data memory, and said register means being initialized with the output of said exclusive-or means.

11. A television receiver incorporating a scramble codec for scrambling and descrambling a picture signal of a television signal, said scramble codec comprising:

means for storing an identification number to secure the picture signal, data storage means for receiving an input picture signal having horizontal scan lines and for alternatively writing each of said horizontal scan lines, said data storage means having a maximum address value, register means being initialized as a function of the identification number, for outputting dissimilar pseudorandom pulse signals for respective ones of said horizontal scan lines, address setting means for generating a first value determined by subtracting the output of said register means from said maximum address value of said data storage means during scrambling and a second value corresponding to the output of said register means during descrambling, and address counter means for providing addresses to said data storage means starting from one of said first and second values generated by said address setting means in order to alternatively read signals for each respective one of said horizontal scan lines from said data storage means.

12. A television receiver incorporating a scramble codec for scrambling and descrambling a sound signal of a television signal, said scramble codec comprising:

conversion means for converting an input analog sound signal to a first serial bit stream during scrambling, demodulating means for demodulating the sound signal from the television signal and converting it to a second bit stream during descrambling, pseudorandom pulse generating means for generating and outputting audio pseudorandom pulse signals, first exclusive-or means for calculating and outputting an exclusive logical sum of the output of said pseudorandom pulse generating means and one of said first and second bit streams, modulating means for modulating the output of said first exclusive-or means during scrambling and producing an output, mixing means for mixing the output of said modulating means with a picture signal, and demodulating means for demodulating the output of said first exclusive-or means to obtain an original analog signal.

13. A television receiver according to claim 12 further comprising
means for storing an identification number to secure the sound signal,
the identification number being used to set the initial value of said pseudorandom pulse generating means.

14. A television receiver according to claim 12 further comprising:
means for storing an identification number to secure the sound signal,
memory means for storing and outputting key data values differing from one television receiver to another television receiver, and
second exclusive-or means for calculating and outputting an exclusive logical sum of the identification number and the output of said memory means, and
said pseudorandom pulse generating means being initialized with the output of said second exclusive-or means.

15. A television receiver incorporating a scramble codec for scrambling and descrambling a picture signal and a sound signal of a television signal, said scramble codec comprising:
means for storing an identification number to secure said picture signal and said sound signal,
data storage means for receiving the picture signal having each horizontal scan line, and for alternatively writing each of said horizontal scan lines, said data storage means having a maximum address value,
register means, being initialized as a function of the identification number, for outputting dissimilar pseudorandom pulses for respective ones of said horizontal scan lines,
address setting means for generating a first value corresponding to the output of said register means during scrambling and a second value determined by subtracting the output of said register means from said maximum address value of said data storage means during descrambling,
address counter means for providing addresses to said data storage means starting from one of the first and second values generated by said address setting means in order to alternatively read signals for each respective one of said horizontal scan lines from said data storage means,
conversion means for converting a first sound signal to a first bit stream during scrambling,
demodulating means for demodulating a second sound signal from the television signal and converting it to a second bit stream,
pseudorandom pulse generating means for generating and outputting audio pseudorandom pulse signals,
first exclusive-or means for calculating and outputting an exclusive logical sum of the output of said sound pseudorandom pulse generating means and one of said first and second bit streams,
modulating means for modulating the output of said first exclusive-or means during scrambling and producing an output,
mixing means for mixing the output of said modulating means with the picture signal, and demodulating means for demodulating the output of said first exclusive-or means to obtain an original analog signal.

16. A television receiver according to claim 15 wherein the identification number is set as the initial value of said pseudorandom pulse generating means.

17. A television receiver according to claim 15 further comprising:
memory means for storing and outputting key data values differing from one television receiver to another television receiver, and
second exclusive-or means for calculating and outputting an exclusive logical sum of the identification number and the output of said key data memory,
said register means being initialized with the output of said second exclusive-or means and
said pseudorandom pulse generating means being initialized with the output of said second exclusive-or means.

18. A television receiver including a scramble codec which scrambles and descrambles a picture signal and a sound signal of a television signal, said scramble codec comprising:
means for storing an identification number to secure said picture signal and said sound signal,
data storage means for alternatively storing horizontal scan lines of input picture signals, said data storage means having a maximum address value,
register means, being initialized as a function of the identification number, for outputting dissimilar pseudorandom pulse signals for respective ones of said horizontal scan lines,
address setting means for generating a first value determined by subtracting the output of said register means from said maximum address value of said data storage means during scrambling and a second value corresponding to the output of said register means during descrambling, and
address counter means for providing addresses to said data storage means starting from one of said first and second values generated by said address setting means in order to alternately read signals for each respective one of said horizontal scan lines from said data storage means said,
conversion means for converting an input analog sound signal to a first serial bit stream during scrambling,
demodulating means for demodulating the sound signal from the television signal and converting it to a second bit stream during descrambling,
pseudorandom pulse generating means for generating and outputting audio pseudorandom pulse signals,
first exclusive-or means for calculating and outputting an exclusive logical sum of the output of said pseudorandom pulse generating means and one of said first and second bit streams,
modulating means for modulating the output of said first exclusive-or means during scrambling,
mixing means for mixing the modulated signal with the picture signal and
demodulating means for demodulating the output of said first exclusive-or means to obtain an original analog signal.

19. A television receiver according to claim 9 further comprising an input means for entering an ID number.

20. A television receiver according to claim 9 which scrambles or descrambles externally input NTSC signals.

21. A television receiver according to claim 9 wherein said nonlinear feedback shift register whose number constituent bits and feedback loop are randomly set.

* * * * *

UNITED STATES PATENT AND TRADEMARK OFFICE
CERTIFICATE OF CORRECTION

PATENT NO. : 5,355,409
DATED : October 11, 1994
INVENTOR(S) : Masayoshi Hirashima It is certified that error appears in the above-identified patent and that said Letters Patent is hereby corrected as shown below:

Claim 7, Column 17,
Line 53 before the word "is" insert the word --means--.

Claim 8, Column 17,
Line 55 delete "including" and insert --comprising--.
Line 55 delete "an ID" and insert --the identification--.

Claim 19, Column 20,
Line 61 delete "an ID" and insert --the identification--.

Claim 20, Column 20,
Lines 62-63 delete "which scrambles or descrambles" and insert --wherein one of scrambling and descrambling is performed on--.

Claim 21, Column 20,
Line 66, delete "said nonlinear feedback shift" and insert --the number of constituent bits and feedback loops of said--.
Line 66, after "register" insert --means is--.
Line 66-67 delete "whose number of constituent bits and feedback loop are".

Signed and Sealed this

Third Day of July, 2001

*Attest:*

NICHOLAS P. GODICI
*Attesting Officer*      *Acting Director of the United States Patent and Trademark Office*